United States Patent
Lee et al.

(10) Patent No.: US 10,116,342 B2
(45) Date of Patent: Oct. 30, 2018

(54) APPARATUS AND METHOD FOR CONTROLLING SIGNAL GAIN IN WIRELESS TRANSMITTER

(71) Applicant: Samsung Electronics Co., Ltd., Suwon-si, Gyeonggi-do (KR)

(72) Inventors: Hong-Tak Lee, Hwaseong-si (KR); Dae-Hyun Kwon, Hwaseong-si (KR); Sang-Hyun Baek, Yongin-si (KR); Xi Yao, Suwon-si (KR); Jong-Soo Lee, Seoul (KR); Young-Taek Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/329,042

(22) Filed: Jul. 11, 2014

(65) Prior Publication Data

US 2015/0118979 A1    Apr. 30, 2015

(30) Foreign Application Priority Data

Oct. 31, 2013    (KR) .................. 10-2013-0131693

(51) Int. Cl.
    *H04B 1/04*      (2006.01)
    *H03B 7/04*      (2006.01)
    *H04W 88/02*     (2009.01)
    *H03G 3/30*      (2006.01)

(52) U.S. Cl.
    CPC ... *H04B 1/0483* (2013.01); *H04B 2001/0416* (2013.01)

(58) Field of Classification Search
    CPC .................. H04B 1/0475; H04B 2001/0416; H04B 1/04; H04B 7/04; H04B 1/10; H04B 1/109; H04B 1/26; H03G 3/3042; H04W 88/02; H03D 3/007; H03D 3/008; H03D 3/009; H03D 7/166; H03D 2200/0086
    See application file for complete search history.

(56) References Cited

U.S. PATENT DOCUMENTS

| 5,307,512 | A | 4/1994 | Mitzlaff | |
|---|---|---|---|---|
| 6,625,427 | B1* | 9/2003 | Kayano | H01P 1/20336 455/103 |
| 7,058,364 | B2* | 6/2006 | Atkinson et al. | 455/76 |
| 7,130,604 | B1* | 10/2006 | Wong | H03D 7/12 455/302 |
| 7,272,370 | B2* | 9/2007 | Wang | H03D 7/165 455/209 |
| 7,421,259 | B2* | 9/2008 | Gomez | H03D 7/1441 455/130 |

(Continued)

FOREIGN PATENT DOCUMENTS

| CN | 1806399 A | 7/2006 |
|---|---|---|
| CN | 101316105 A | 12/2008 |

(Continued)

*Primary Examiner* — Pablo Tran
(74) *Attorney, Agent, or Firm* — Jefferson IP Law, LLP

(57) ABSTRACT

To control a gain of a transmit signal in a wireless transmitter, the wireless transmitter is provided. The wireless transmitter includes a baseband processor for processing an analog baseband transmit signal, and a Radio Frequency (RF) signal processor including a plurality of mixers. The plurality of mixers are configured to share an output signal of the baseband processor as an input.

20 Claims, 7 Drawing Sheets

(56) References Cited

U.S. PATENT DOCUMENTS

| | | | |
|---|---|---|---|
| 7,519,348 B2* | 4/2009 | Shah | H03D 7/14 |
| | | | 455/285 |
| 7,619,468 B1 | 11/2009 | Bowles et al. | |
| 8,138,817 B2* | 3/2012 | Brekelmans | H03D 7/165 |
| | | | 327/355 |
| 8,509,351 B1* | 8/2013 | Khlat | H03C 5/00 |
| | | | 370/207 |
| 2004/0219899 A1 | 11/2004 | Ho et al. | |
| 2005/0233723 A1* | 10/2005 | Gomez | H03D 7/1441 |
| | | | 455/323 |
| 2006/0040634 A1* | 2/2006 | Wang | H03D 7/165 |
| | | | 455/313 |
| 2007/0117530 A1* | 5/2007 | Davis | 455/316 |
| 2010/0222011 A1 | 9/2010 | Behzad | |
| 2011/0051780 A1* | 3/2011 | Kawasaki | 375/135 |
| 2012/0281730 A1 | 11/2012 | Hulvey | |
| 2012/0302193 A1 | 11/2012 | Seendripu et al. | |
| 2013/0183917 A1 | 7/2013 | Asuri et al. | |
| 2013/0266085 A1* | 10/2013 | Sesia | H04B 7/0413 |
| | | | 375/295 |
| 2014/0030991 A1* | 1/2014 | Liu | H04B 17/004 |
| | | | 455/115.3 |

FOREIGN PATENT DOCUMENTS

| | | |
|---|---|---|
| CN | 102165686 A | 8/2011 |
| JP | 2012-065358 A | 3/2012 |
| KR | 10-2008-0051199 A | 6/2008 |
| WO | 2010/037212 A1 | 4/2010 |

\* cited by examiner

APPARATUS AND METHOD FOR CONTROLLING SIGNAL GAIN IN WIRELESS TRANSMITTER

CROSS-REFERENCE TO RELATED APPLICATION(S)

This application claims the benefit under 35 U.S.C. § 119(a) to a Korean patent application filed on Oct. 31, 2013 in the Korean Intellectual Property Office and assigned Ser. No. 10-2013-0131693, the entire disclosure of which is hereby incorporated by reference.

TECHNICAL FIELD

The present disclosure relates to signal gain control of a wireless transmitter.

BACKGROUND

A wireless transceiver includes a baseband modem and a Radio Frequency Integrated Circuit (RFIC) to physically send and receive signals. The RFIC transmits a baseband signal using radio waves in a wireless communication environment, and forwards a signal received via an antenna to the baseband modem without distortion. Particularly, as wireless communication standards evolve, a transmit circuit of the RFIC advances to linearly amplify and process more complicated signals. In terms of performance and efficiency, the signal processing of the RFIC requires minimum current consumption.

Wideband Code Division Multiple Access (WCDMA), being a $3^{rd}$ generation (3G) communication standard, and Long Term Evolution (LTE), being a $4^{th}$ generation (4G) communication standard, require a dynamic range of an output power. To satisfy the above-described requirements of the communication standard, the gain of the RFIC should be controlled finely through certain steps beyond 80 dB. Typically, to meet the dynamic range over 80 dB, an analog baseband circuit and a Radio Frequency (RF) Variable Gain Amplifier (VGA) are designed to vary the gain.

The gain variation at the analog baseband stage can change a Direct Current (DC) offset in size. The DC offset can appear as Local Oscillator (LO) leakage at the transmit output stage and thus Error Vector Magnitude (EVM) performance can be degraded. Hence, the change of the DC offset size according to the gain variation at the analog baseband stage needs to be compensated through calibration. As a load of the analog baseband stage for the desired dynamic range increases, a calibration point required for the DC offset increases in number, which extends the calibration time. To obtain the dynamic range of the gain, it is advantageous to minimize the load of the analog baseband stage and to increase the load of the RF stage for the dynamic range of the gain. In this regard, it is general to design a multi-stage (two or more stages) RF VGA structure for processing the dynamic range over 60 dB.

An amplifier of two or more stages can relatively easily obtain the dynamic range of the required gain. However, the amplifier of two or more stages increases noise at the transmit output stage. In particular, the increased noise in the receive band can degrade reception sensitivity performance. There are two general methods for mitigating the noise at the transmit output stage. One is to reject the noise in the receive band, and the other is to suppress the noise in the receive band.

The receive band noise at the transmit output stage can be cancelled using a Surface Acoustic Wave (SAW) filter. However, the SAW filter causes gain loss, and additional current is consumed to compensate for the gain loss. When a single transceiver supports multiple bands or multiple modes, the number of the required SAW filters increases. The increased number of the SAW filters increases an area of a terminal Printed Circuit Board (PCB) and Bill of Materials (BOM). Accordingly, the SAW filter is not the best solution for the receive band noise rejection. A desirable method for reducing the current consumption and the BOM is to suppress the noise in the transmit output stage. For doing so, it is necessary to design the RF VGA in a single step. To provide the required gain, amplifier elements can be combined in parallel as shown in FIG. 1.

FIG. 1 illustrates amplifier elements for controlling an RF gain in a wireless transmitter according to the related art.

Referring to FIG. 1, an output of a mixer 110 is input to an array of N amplifier elements 120-1 through 120-N. The gain is controlled by turning the array of N amplifier elements 120-1 through 120-N on and off.

Referring to FIG. 1, the amplifier element 120-1 alone is turned on, and the other amplifier elements 120-2 through 120-N are turned off. Since the signal output from the mixer 120 is shared by the input stages of the array of N amplifier elements 120-1 through 120-N, a high-frequency signal output from the mixer 110 is fed as the leakage signal to the other amplifier elements 120-2 through 120-N being turned off. The leakage signal, which is combined with the output of the output element 120-1, affects a final output signal. In particular, when a very small output is required, the amplifier element that is turned off is greater than the amplifier element that is turned off in number and thus a parasitic component is more influential in the final output. That is, the leakage signal can be seriously problematic in the low-level output. Further, when the leakage signal is similar to the normal signal in magnitude, Inner Loop Power Control (ILPC) and gain step accuracy required by the 3G and 4G communication standards cannot be satisfied.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for controlling a signal gain in a wireless transmitter.

Another aspect of the present disclosure is to provide an apparatus and a method for providing a dynamic range of a signal gain in a wireless transmitter.

Yet another aspect of the present disclosure is to provide an apparatus and a method for finely controlling a gain in a wireless transmitter.

Another aspect of the present disclosure is to provide an apparatus and a method for mitigating a leakage signal in a wireless transmitter.

Another aspect of the present disclosure is to provide an apparatus and a method for reducing current consumed to control a signal gain in a wireless transmitter.

In accordance with an aspect of the present disclosure, an apparatus for a wireless transmitter is provided. The apparatus includes a baseband processor configured to process an analog baseband transmit signal, and a RF signal processor comprising a plurality of mixers. The plurality of mixers are configured to share an output signal of the baseband processor as an input.

In accordance with another aspect of the present disclosure, a method for operating a wireless transmitter is provided. The method includes, when a first output level is required, controlling, by the wireless transmitter, a signal gain of a baseband analog signal through a first path comprising a first mixer, and when a second output level is required, controlling the signal gain of the baseband analog signal through a second path comprising a second mixer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a technique for controlling a signal gain in a wireless transmitter.

A signal processing path for RF gain control according to various embodiments of the present disclosure can include a mixer, a LO chain, and an amplifier in two or more separate parts. Accordingly, the operating mixer and amplifier can differ according to an intended output level. That is, the wireless transmitter includes a plurality of signal processing paths corresponding to different output levels and selects the operating path at the output level. The signal processing paths each include the mixer and the amplifier. The paths are combined at a front stage of output matching.

To provide different output levels, the signal processing paths can vary a size or the number of amplifier elements of amplifiers. For example, the amplifier element can include a transistor. As the transistor increases in number or in size, the amplifier generates a signal of a higher output level.

Figure 1:
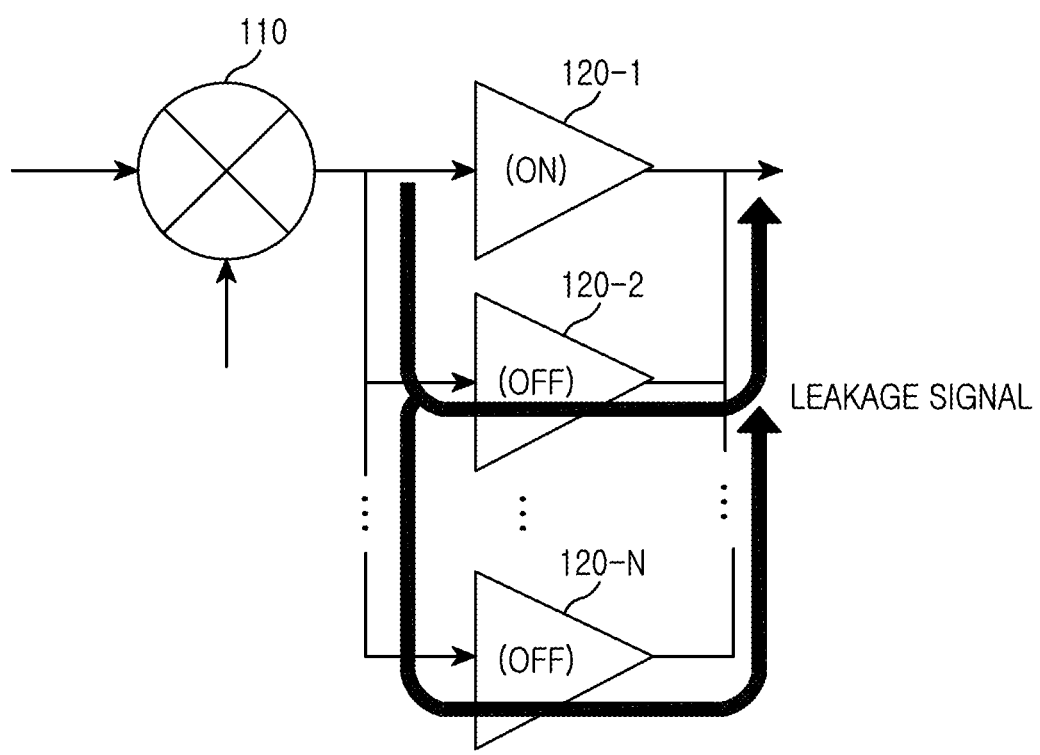
FIG. 1 illustrates amplifier elements for controlling an RF gain in a wireless transmitter according to the related art.
Figure 2:
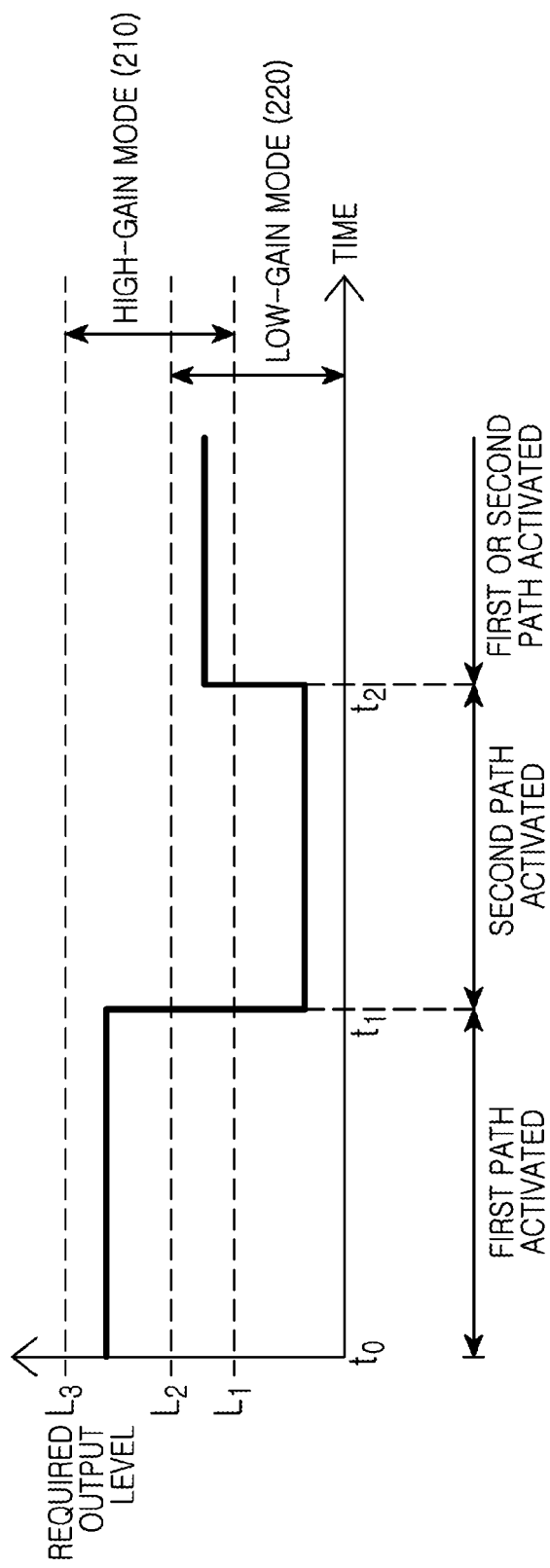
FIG. 2 illustrates a gain control path activated in a wireless transmitter according to an embodiment of the present disclosure.

FIG. 2 illustrates a gain control path activated in a wireless transmitter according to an embodiment of the present disclosure. FIG. 2 also illustrates a required output level change of the wireless transmitter, a mode based on the required output level, and an activated gain control path.

Referring to FIG. 2, to ease the understanding, a mode for obtaining an output that is over a particular level (e.g., $L_1$) and is below a particular level (e.g., $L_3$) is referred to as a high-gain mode 210, and a mode for obtaining an output that is below a particular level (e.g., $L_2$) is referred to as a low-gain mode 220.

Referring to FIG. 2, in a duration from a time $t_0$ to a time $t_1$, the required output level exceeds $L_1$ and the wireless transmitter operates in the high-gain mode 210. Hence, a first path is activated. At this time, a second path is inactive, that is, turned off. Next, in a duration from the time $t_1$ to a time $t_2$, the required output level is below $L_2$ and the wireless transmitter operates in the low-gain mode 220. Hence, the second path is activated and the first path is turned off.

After time $t_2$, the required output level is between $L_1$ and $L_2$. That is, the required output level lies in the overlapping range of the output range of the high-gain mode 210 and the output range of the low-gain mode 220. In this case, the wireless transmitter operates neither in the high-gain mode 210 nor in the low-gain mode 220. Hence, the wireless transmitter can selectively operate according to other index. For example, the wireless transmitter can activate a high-performance path when linearity is limited more, and a low-current path when the current consumption is limited more (e.g., the first path or the second path can be activated).

Figure 3:
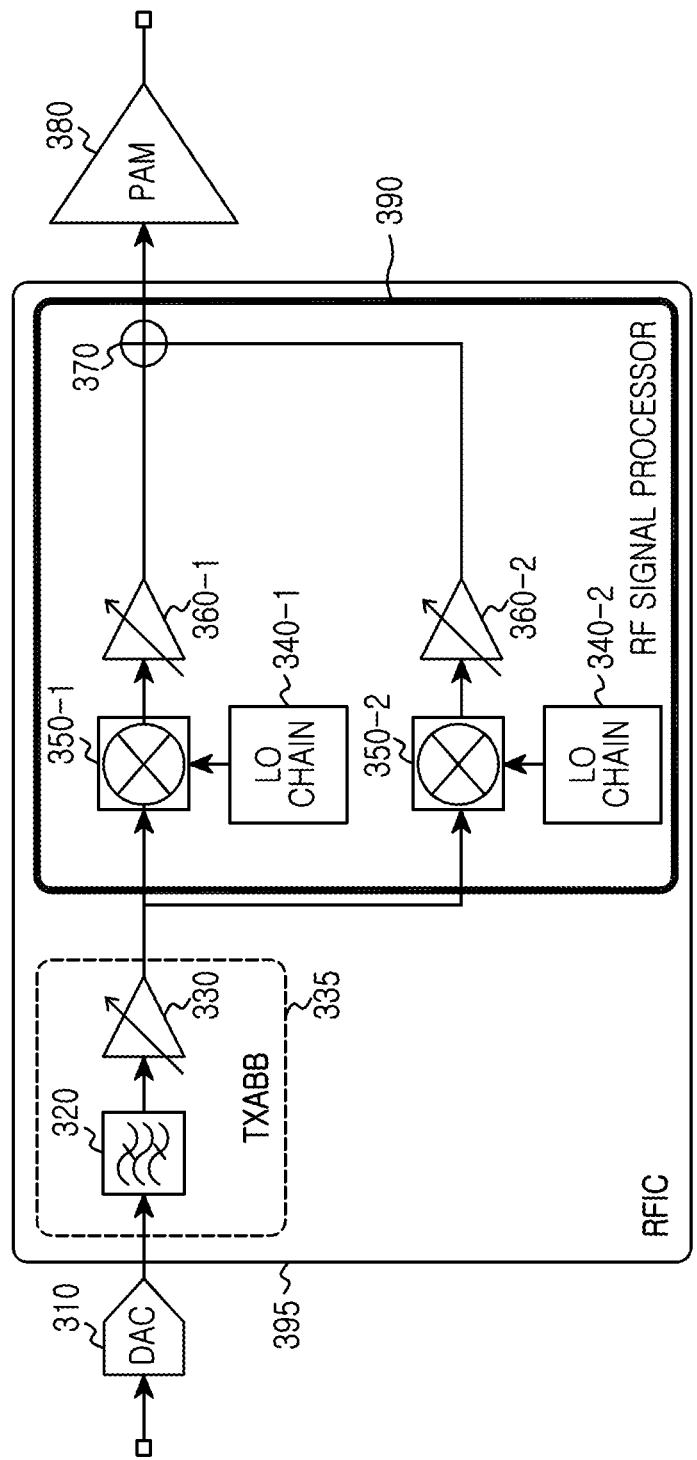
FIG. 3 illustrates a wireless transmitter according to an embodiment of the present disclosure.

FIG. 3 is a block diagram of a wireless transmitter according to an embodiment of the present disclosure. In FIG. 3, two signal processing paths are illustrated.

Referring to FIG. 3, a wireless transmitter includes a Digital to Analog Converter (DAC) 310, a filter 320, a baseband VGA 330, a first LO chain 340-1, a second LO chain 340-2, a first mixer 350-1, a second mixer 35-2, a first RF VGA 360-1, a second RF VGA 360-2, an adder 370, and a Pulse Amplitude Modulation (PAM) 380. The filter 320 and the baseband VGA 330 can be referred to as a transmit analog baseband (TXABB) processor 335. The first LO chain 340-1, the second LO chain 340-2, the first mixer 350-1, the second mixer 350-2, the first RF VGA 360-1, the second RF VGA 360-2, and the adder 370 can be referred to as an RF signal processor 390. The TXABB processor 335 and the RF signal processor 390 can be combined to form the RFIC 395.

The DAC 310 converts a digital signal to an analog signal. The wireless transmitter can further include a means (not shown) for generating a signal input to the DAC 310 by encoding and modulating a transmit bitstring.

The filter 320 removes an unintended frequency component from the analog signal. For example, the filter 320 can remove a DAC image signal in the analog signal. The DAC image indicates a copy signal in a multiple frequency of a clock frequency of the DAC 130. The filter 320 can be a SAW filter.

The baseband VGA 330 controls the gain of the signal output from the filter 320. The gain control by the baseband VGA 330 is to obtain part of the dynamic range of the signal gain, and the baseband VGA 330 processes the load of the baseband in the dynamic range. That is, the baseband VGA 330 adjusts the magnitude of the analog signal input to the first mixer 350-1 and the second mixer 350-2.

The first LO chain 340-1 generates a high-frequency signal required to generate an RF signal in the first mixer 350-1, and the second LO chain 340-2 generates a high-frequency signal required to generate an RF signal in the second mixer 350-2. The first LO chain 340-1 and the second LO chain 340-2 can be of a Phase-Locked Loop (PLL) structure. According to the path selection based on the output level, either the first LO chain 340-1 or the second LO chain 340-2 can be turned off.

The first mixer 350-1 up-converts the baseband signal fed from the baseband VGA 330 to the RF signal using the high-frequency signal output from the first LO chain 340-1. The second mixer 350-2 up-converts the baseband signal fed from the baseband VGA 330 to the RF signal using the high-frequency signal output from the second LO chain 340-2. The first mixer 350-1 and the second mixer 350-2 share the output signal of the baseband VGA 330. According to the path selection based on the output level, either the first mixer 350-1 or the second mixer 350-2 can be turned off. Each signal processing path includes a separate mixer and thus the up-converted RF signal is not shared as the input of the paths. That is, by means of the first mixer 350-1 and the second mixer 350-2, the separate input signals can be fed to the amplifiers 360-1 and 360-2 of the path. That is, by virtue of the first mixer 350-1 and the second mixer 350-2, the input stages of the amplifiers 360-1 and 360-2 of the path do not share the single signal.

The first RF VGA 360-1 controls the gain of the RF signal output from the first mixer 350-1. The second RF VGA 360-2 controls the gain of the RF signal output from the second mixer 350-2. The first RF VGA 360-1 and the second RF VGA 360-2 control the signal gain at different output levels. The first RF VGA 360-1 and the second RF VGA 360-2 each include at least one amplifier element. For example, the amplifier element can include a transistor. For example, when the first RF VGA 360-1 processes a greater output level than the second RF VGA 360-2, the first RF VGA 360-1 can include more output elements or greater output elements than the second RF VGA 360-2. According to the path selection based on the output level, either the first RF VGA 360-1 or the second RF VGA 360-2 can be turned off.

The adder 370 adds the gain-controlled gains of the first RF VGA 360-1 and the second RF VGA 360-2. That is, the first RF VGA 360-1 and the second RF VGA 360-2 can operate at the same time. The PAM 380 amplifies the gain-controlled signals added by the adder 370.

Referring to FIG. 3, the first LO chain 340-1, the first mixer 350-1, and the first RF VGA 360-1 build a first path, and the second LO chain 340-2, the second mixer 350-2, and the second RF VGA 360-2 build a second path. The first path and the second path can generate the signal of different output levels and operate selectively or concurrently. For example, when a high output level is required, the first LO chain 340-1, the first mixer 350-1, and the first RF VGA 360-1 of the first path can operate, and the second LO chain 340-2, the second mixer 350-2, and the second RF VGA 360-2 of the second path can be turned off. Herein, the off mode can cut power supplied to the modules, or apply an inactive signal.

Referring to FIG. 3, the first LO chain 340-1 and the second LO chain 340-2 can have the same performance. Herein, the performance includes the intended frequency and a signal of other frequency than the intended frequency, that is, a noise characteristic indicating a noise magnitude. High performance signifies that excellent noise characteristic, that is, a low noise level. In this case, the first LO chain 340-1 and the second LO chain 340-2 consume the same current quantity.

Alternatively, the first LO chain 340-1 and the second LO chain 340-2 can have different noise characteristics. Since the noise is also amplified in the gain control, the magnitude of the noise signal greatly affects the final output at a higher output level corresponding to the path of the first LO chain 340-1 and the second LO chain 340-2. That is, when the output level is low, the adverse effect on the noise signal is relatively low. Hence, in the path corresponding to the low output level, the LO chain of the relatively poor noise characteristic can be used. In this case, the current consumption reduces. For example, when the second path corresponds to the lower output level than the first path, the second LO chain 340-2 can have the poorer noise characteristic than the first LO chain 340-1. Accordingly, the second LO chain 340-2 can generate the high-frequency signal merely with the lower current than the first LO chain 340-1.

Referring to FIG. 3, the first path includes the first LO chain 340-1 and the second path includes the second chain 340-2. Namely, each path includes the separate LO chain. Alternatively, a single LO chain can serve as the first LO chain 340-1 and the second LO chain 340-2. That is, the single common LO chain can provide the high-frequency signal to the first mixer 350-1 and the second mixer 350-2, rather than the LO chains for the first path and the second path respectively. In this case, the common LO chain can operate regardless of the path selected for the signal gain control.

Although it is not depicted in FIG. 3, the wireless transmitter can further include a controller for determining at least one of the first path and the second path according to the intended output level and controlling the determined path. For example, the controller can generate a signal for activating the determined path. The controller can also generate a signal for deactivating the other path than the determined path.

Figure 4:
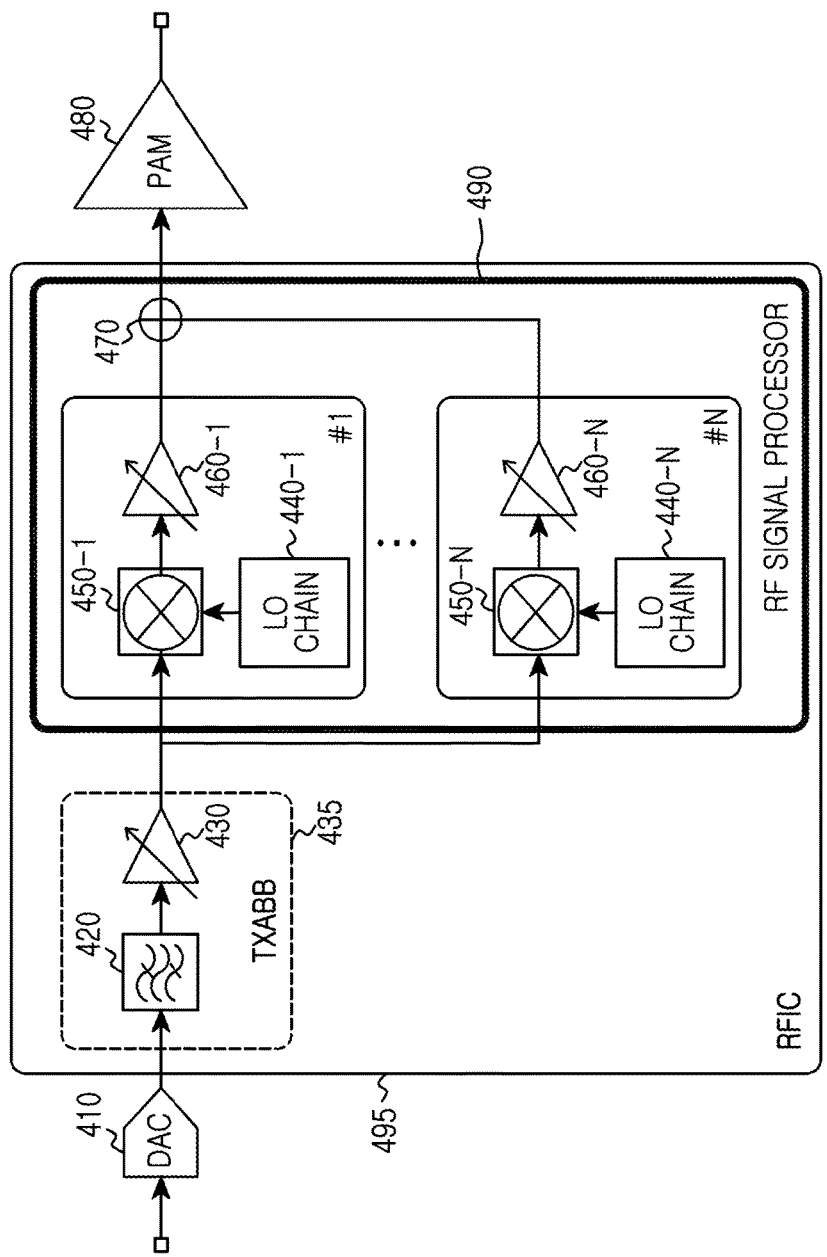
FIG. 4 illustrates a wireless transmitter according to another embodiment of the present disclosure.

FIG. 4 is a block diagram of a wireless transmitter according to another embodiment of the present disclosure. In FIG. 4, an array of N signal processing paths are illustrated.

Referring to FIG. 4, a wireless transmitter includes a DAC 410, a filter 420, a baseband VGA 430, an array of N LO chains 440-1 through 440-N, an array of N mixers 450-1 through 450-N, an array of N RF VGAs 460-1 through 460-N, an adder 470, and a PAM 480. The filter 420 and the baseband VGA 430 can be referred to as the transmit analog baseband (TXABB) processor 435. The array of N LO chains 440-1 through 440-N, the array of N mixers 450-1 through 450-N, the array of N RF VGAs 460-1 through 460-N, and the adder 470 can be referred to as the RF signal processor 490. The TXABB processor 435 and the RF signal processor 490 can be combined to form the RFIC 495.

The DAC 410 converts the digital signal to the analog signal. The wireless transmitter can further include a means (not shown) for generating the signal input to the DAC 410 by encoding and modulating the transmit bitstring.

The filter 420 removes the unintended frequency component from the analog signal. For example, the filter 420 can remove the DAC image signal in the analog signal. The DAC image indicates the copy signal in the multiple frequency of the clock frequency of the DAC 410. The filter 420 can be a SAW filter.

The baseband VGA 430 controls the gain of the signal output from the filter 420. The gain control by the baseband VGA 430 is to obtain part of the dynamic range of the signal gain, and the baseband VGA 430 processes the load of the baseband in the dynamic range. That is, the baseband VGA 430 adjusts the magnitude of the analog signal input to the array of N mixers 450-1 through 450-N.

The array of N LO chains 440-1 through 440-N generate the high-frequency signal required to generate the RF signal in the array of N mixers 450-1 through 450-N. As shown in FIG. 4, the array of N LO chains 440-1 through 440-N and the array of N mixers 450-1 through 450-N can correspond one to one. The array of N LO chains 440-1 through 440-N can be of the PLL structure. According to the path selection based on the output level, part of the array of N LO chains 440-1 through 440-N can be turned off.

The array of N mixers 450-1 through 450-N up-convert the baseband signal fed from the baseband VGA 430 to the RF signal using the high-frequency signal output from the array of N LO chains 440-1 through 440-N. The array of N mixers 450-1 through 450-N share the output signal of the baseband VGA 430. According to the path selection based on the output level, part of the array of N mixers 450-1 through 450-N can be turned off. Each signal processing path includes a separate mixer and thus the up-converted RF signal is not shared as the input of the paths. That is, by means of the array of N mixers 450-1 through 450-N, the separate input signals can be fed to the amplifiers 460-1 and 460-N of the path. That is, by virtue of the array of N mixers 450-1 through 450-N, the input stages of the amplifiers 460-1 and 460-N of the path do not share the single signal.

The array of N RF VGAs 460-1 through 460-N control the gain of the RF signal output from the array of N mixers 450-1 through 450-N. The array of N RF VGAs 460-1 through 460-N control the signal gain at different output levels. The array of N RF VGAs 460-1 through 460-N each include at least one amplifier element. For example, the amplifier element can include a transistor. For example, when the first RF VGA 460-1 processes the higher output level than the N-th RF VGA 460-N, the first RF VGA 460-1 can include more output elements or greater output elements than the N-th RF VGA 460-N. According to the path selection based on the output level, part of the array of N RF VGAs 460-1 through 460-N can be turned off.

The adder 470 adds the gain-controlled gains of the array of N RF VGAs 460-1 through 460-N. That is, all or part of the array of N RF VGAs 460-1 through 460-N can operate at the same time. The PAM 480 amplifies the gain-controlled signals added by the adder 470.

Referring to FIG. 4, the array of N paths are built. The array of N paths can generate the signal of different output levels and operate selectively or concurrently. For example, when a high output level is required, the modules of the first path can operate and the modules of the other path can be turned off. Alternatively, the modules of two or more paths can operate and the modules of the other path can be turned off. Herein, the off mode can cut the power supplied to the modules, or apply the inactive signal.

Referring to FIG. 4, the array of N LO chains 440-1 through 440-N can have the same performance. Herein, the performance includes the intended frequency and the signal of the other frequency than the intended frequency, that is, the noise characteristic indicating the noise magnitude. High performance signifies that excellent noise characteristic, that is, the low noise level. In this case, the array of N LO chains 440-1 through 440-N consume the same current quantity.

Alternatively, the array of N LO chains 440-1 through 440-N can have different noise characteristics. As the output level gets higher, the magnitude of the noise signal greatly affects the final output. That is, at the low output level, the adverse effect on the noise signal is relatively low. Hence, in the path corresponding to the low output level, the LO chain of the relatively poor noise characteristic can be used. In this case, the current consumption reduces.

When the array of N LO chains 440-1 through 440-N can have different noise characteristics, the array of N paths can be divided based on a combination of the output level and the current consumption. That is, multiple paths can have the same output level but consume different current quantities. Also, multiple paths can consume the same current quantity but produce different output levels.

Referring to FIG. 4, the each path includes the separate LO chain. Alternatively, a single LO chain can serve as the array of N LO chains 440-1 through 440-N. That is, the single common LO chain can serve as part of the array of N LO chains 440-1 through 440-N.

Although it is not depicted in FIG. 4, the wireless transmitter can further include a controller for determining at least one of the array of N paths according to the intended output level and controlling the determined path. For example, the controller can generate the signal for activating the determined path. The controller can also generate the signal for deactivating the other path than the determined path.

Figure 5:
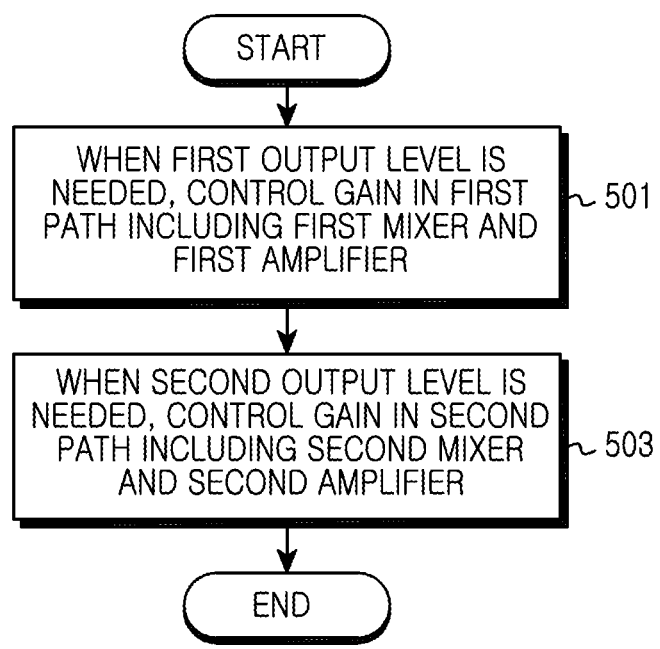
FIG. 5 illustrates operations of a wireless transmitter according to an embodiment of the present disclosure.

FIG. 5 illustrates operations of a wireless transmitter according to an embodiment of the present disclosure.

Referring to FIG. 5, when a first output level is needed, a wireless transmitter controls a gain of an RF signal using a first path including a first mixer and a first amplifier in operation 501. That is, the wireless transmitter includes the plurality of the paths for controlling the gain of the RF signal, and the paths include the mixer and the amplifier independently from the other paths. That is, the paths can share the baseband signal at the input stage of the mixer.

When a second output level is needed, a wireless transmitter controls the gain of the RF signal using a second path including a second mixer and a second amplifier in operation 503. To generate the RF signal, the wireless transmitter provides the high-frequency signal to the second mixer. For doing so, the wireless transmitter can reuse the LO chain for providing the high-frequency signal to the first mixer, or include a separate LO chain for providing the high-frequency signal to the second mixer. The separate LO chain for providing the high-frequency signal to the second mixer can have a different noise characteristic from the LO chain which provides the high-frequency signal to the first mixer.

Next, although it is not illustrated, the wireless transmitter can amplify the power of the gain-controlled signal and then send the signal via an antenna.

Figure 6:
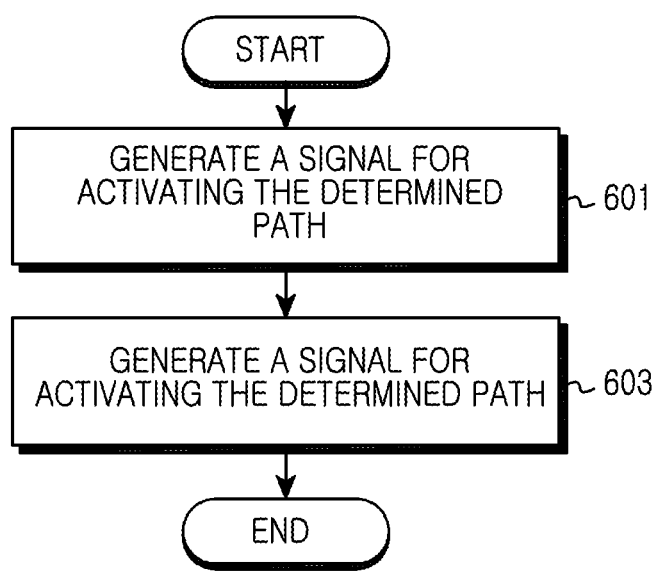
FIG. 6 illustrates operations of a wireless transmitter according to another embodiment of the present disclosure.

FIG. 6 illustrates operations of a wireless transmitter according to another embodiment of the present disclosure.

Referring to FIG. 6, a wireless transmitter determines an RF gain control path corresponding to an output level in operation 601. That is, the wireless transmitter includes the plurality of the paths for controlling the gain of the RF signal, and the paths include the mixer and the amplifier independently from the other paths. For example, the wireless transmitter can store information defining the correspondence between the output level and the RF gain control path, and select the path corresponding to the determined output level based on the information.

In operation 603, the wireless transmitter generates the signal for activating the determined path. That is, the wireless transmitter can include the controller for controlling to activate/deactivate the paths and to generate the signal for activating the determined path. Although it is not illustrated in FIG. 6, the wireless transmitter can further generate the signal for deactivating the other paths than the determined path.

Referring to FIG. 6, the wireless transmitter determines the path for controlling the signal gain based on the output level. Alternatively, the wireless transmitter can determine the path for controlling the signal gain based on the current consumption. Alternatively, the wireless transmitter can determine the path for controlling the signal gain based on the output level and the current consumption.

Figure 7:
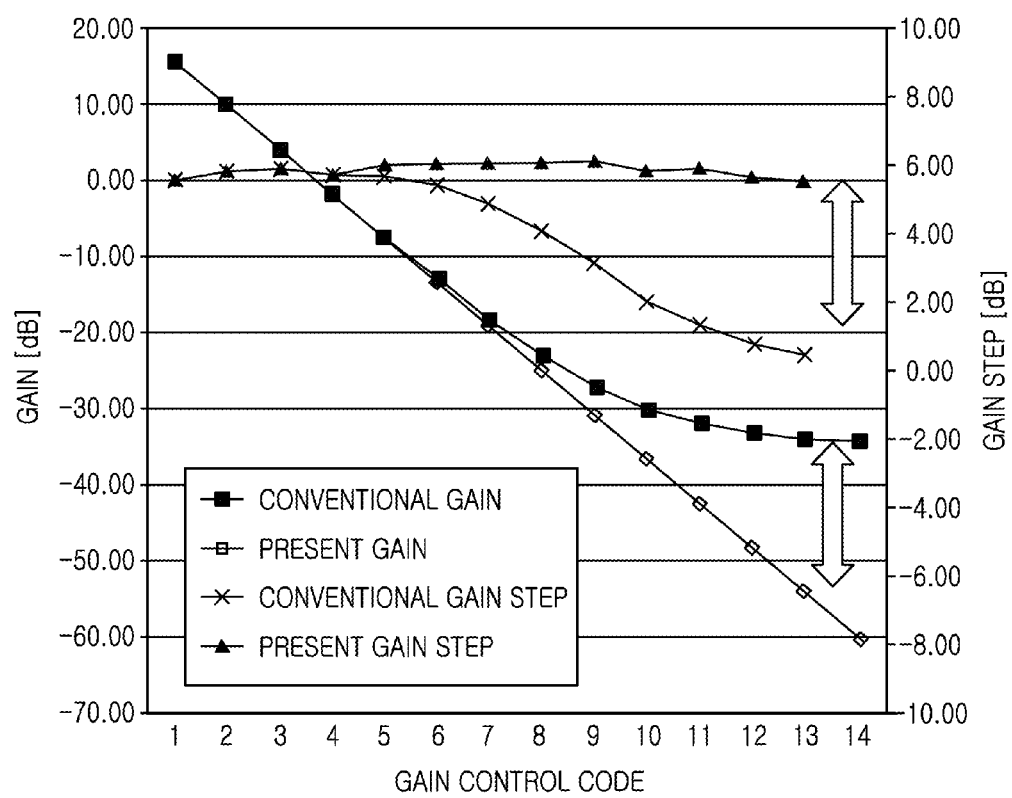
FIG. 7 illustrates a performance graph of the wireless transmitter according to an embodiment of the present disclosure.

FIG. 7 is a performance graph of a wireless transmitter according to an embodiment of the present disclosure.

Referring to FIG. 7, a horizontal axis indicates a gain control code, a vertical axis on the left indicates a gain, and the vertical axis on the right indicates a gain step. The gain control code is defined to correspond to a gain step at intervals of 6 dB.

It is advantageous that the output is lowered as the gain control code rises. However, the method of the related art gradually decreases the magnitude of the gain step at the lower output as shown in FIG. 7, rather than maintaining the constant magnitude. This is because the leakage signal of the amplifier elements turned off increases the magnitude of the final output against the intended level. In contrast, the present disclosure keeps the constant magnitude of the gain step compared to the method of the related art and thus yields the final output of the low output level.

The RFIC structure can obtain the dynamic range and reduce the operation current by minimizing the leakage signal.

In terms of the leakage signal, the path is divided at the mixer and accordingly the separate input is fed to the amplifiers of the path. Since the amplifier of the path for the low-gain mode is optimized for the low output, the size of the amplifier elements coupled in parallel is reduced compared to the method of the related art and thus the parasitic component decreases. In addition, since the mixer can employ the small transistor for the low-gain mode, the leakage of the LO signal in the mixer also reduces. Thus, compared to the method of the related art, the present disclosure can easily attain the dynamic range and an error in the gain control diminishes.

In terms of the current consumption, since the current quality consumed by the amplifier varies according to the output level, the present disclosure does not consume more current than the method of the related art. Additionally, the mixer and the LO chain in the low-gain mode can differ from the path of the high-gain mode. That is, when the mixer and the LO chain include a relatively small cell for the sake of the low-gain mode, they can consume less current than the high-gain mode.

Particularly, it is general that the LO chain is designed to be sensitive to the requirement of the transmit noise. According to the communication standard, an absolute value of the noise in the receive frequency band can be an index in the LO chain design. The requirement is sensitive to the high output of the transmit signal and obtain a sufficient margin in the low output. The low-noise design of the LO chain requires more current consumption and thus the LO chain in the low-gain mode can be designed by taking into account the low power, rather than the noise characteristic. The circuit is configured per mode, and the present disclosure can reduce the current consumption of the RFIC.

The wireless transmitter includes the plurality of the paths for controlling the gain at the RF stage and thus prevents the performance degradation due to the leakage signal.

The transmitter is designed in the high-performance mode and the low-current mode at the same output level, and selectively operates if necessary. Therefore, the transmitter can reduce the additional current consumption unless the high performance is needed.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for a transmitter, the apparatus comprising:
 a plurality of mixers respectively coupled with a baseband processor providing a baseband signal;
 a plurality of variable gain amplifiers (VGAs) respectively coupled with the plurality of mixers;
 a plurality of local oscillators (LOs) respectively coupled with the plurality of mixers, the plurality of LOs comprising a first LO for a gain greater than a first threshold and a second LO for a gain lower than a second threshold which is greater than the first threshold;
 an antenna operatively coupled to each of the plurality of VGAs; and
 a controller configured to, if a required gain of the transmitter is greater than the first threshold and is lower than the second threshold,
 identify a signal path from a first signal path for a high performance mode and a second signal path for a low power consumption mode among a plurality of signal paths, each of the plurality of signal paths comprising each of the plurality of mixers, each of the plurality of VGAs, and each of the plurality of LOs, respectively,
 wherein the antenna is configured to transmit an output signal generated by using the identified signal path from the baseband signal,
 wherein the first signal path corresponds to the required gain and the first LO in the first signal path is configured to consume a first current quantity, and
 wherein the second signal path corresponds to the required gain and the second LO in the second signal path is configured to consume a second current quantity less than the first current quantity.

2. The apparatus of claim 1,
 wherein each of the plurality of mixers is configured to generate a radio frequency (RF) signal by up-converting the baseband signal by using a frequency provided from each of the plurality of LOs, and
 wherein each of the plurality of VGAs is configured to amplify the RF signal.

3. The apparatus of claim 2, further comprising:
 an adder coupled with the plurality of VGAs;
 a power amplifier module (PAM) coupled with the adder; and
 the antenna coupled to the PAM,
 wherein the adder is configured to generate a sum signal adding all of the RF signal, and
 wherein the PAM is configured to generate the output signal by amplifying the sum signal.

4. The apparatus of claim 1,
 wherein a size of the second LO in the second signal path is smaller than a size of the first LO in the first signal path.

5. The apparatus of claim 1, wherein the controller is further configured to generate a signal for activating the identified signal path.

6. The apparatus of claim 5, wherein the controller is further configured to:
 generate a deactivation signal for deactivating other signal paths except the identified signal path among the plurality of signal paths.

7. The apparatus of claim 1, further comprising:
 a storage configured to store information regarding a plurality of gains corresponding to the plurality of signal paths,
 wherein each of the first signal path and the second signal path corresponds to the required gain of the transmitter, and
 wherein the signal path is identified among the plurality of signal paths by using the information, the required gain, and whether an operation mode of the transmitter is the high performance mode or the low consumption mode.

8. The apparatus of claim 1,
 wherein the plurality of LOs include the first LO, the second LO, and a third LO,
 wherein the first signal path and the second signal path correspond to the required gain among the plurality of signal paths, and
 wherein a third signal path including the third LO corresponds to another gain among the plurality of signal paths.

9. The apparatus of claim 1,
 wherein the plurality of VGAs include a first VGA for a gain greater than the first threshold in the first signal path, a second VGA for a gain lower than the second threshold in the second signal path, and a third VGA for a gain lower than the first threshold in a third signal path, and
 wherein a size of the third VGA in the third signal path is smaller than a size of the first VGA in the first signal path.

10. The apparatus of claim 1, wherein the first current quantity is greater than the second current quantity such that a first noise magnitude regarding the first LO for the high performance mode is lower than a second noise magnitude regarding the second LO for the low consumption mode.

11. A method for operating a transmitter, the method comprising:
 if a required gain of the transmitter is greater than a first threshold and is lower than a second threshold, identifying a signal path from a first signal path for a high performance mode and a second signal path for a low power consumption mode among a plurality of signal paths, each of the plurality of signal paths comprising each of a plurality of mixers respectively coupled with a baseband processor, each of a plurality of variable gain amplifiers (VGAs) respectively coupled with the plurality of mixers, and each of a plurality of local oscillators (LOs) respectively coupled with the plurality of mixers;
 generating, by using the identified signal path, an output signal from a baseband signal provided from the baseband processor; and
 transmitting, by an antenna operatively coupled to each of the plurality of VGAs, the output signal,
 wherein the plurality of LOs comprises a first LO for a gain greater than the first threshold and a second LO for a gain lower than the second threshold which is greater than the first threshold,
 wherein the first signal path corresponds to the required gain and the first LO in the first signal path is configured to consume a first current quantity, and
 wherein the second signal path corresponds to the required gain and the second LO in the second signal path is configured to consume a second current quantity less than the first current quantity.

12. The method of claim 11, further comprising:
generating, by each of the plurality of mixers, a radio frequency (RF) signal by up-converting the baseband signal by using a frequency provided from each of the plurality of LOs; and
amplifying, by each of the plurality of VGAs, the RF signal.

13. The method of claim 12, further comprising:
generating, by a adder, a sum signal, by adding all of the RF signal;
generating, by a power amplifier module (PAM), the output signal of the transmitter by amplifying the sum signal,
wherein the adder is coupled with the plurality of VGAs,
wherein the PAM is coupled with the adder, and
wherein the antenna is coupled to the PAM.

14. The method of claim 11,
wherein a size of the second LO in the second signal path is smaller than a size of the first LO in the first signal path.

15. The method of claim 11, further comprising:
generating a signal for activating the identified signal path.

16. The method of claim 15, further comprising:
generating a deactivation signal for deactivating other signal paths except the identified signal path among the plurality of signal paths.

17. The method of claim 11, wherein identifying the signal path comprises:
identifying the signal path among the plurality of signal paths by using the required gain, information regarding a plurality of gains corresponding to the plurality of signal paths, and whether an operation mode of the transmitter is the high performance mode or the low consumption mode,
wherein each of the first signal path and the second signal path corresponds to the required gain of the transmitter, and
wherein the information is stored in a storage of the transmitter.

18. The method of claim 11,
wherein the plurality of LOs include the first LO, the second LO, and a third LO,
wherein the first signal path and the second signal path correspond to the required gain among the plurality of signal paths, and
wherein a third signal path including the third LO corresponds to another gain among the plurality of signal paths.

19. The method of claim 11,
wherein the plurality of VGAs include a first VGA for a gain greater than the first threshold in the first signal path, a second VGA for a gain lower than the second threshold in the second signal path, and a third VGA for a gain lower than the first threshold in a third signal path, and
wherein a size of the third VGA in the third signal path is smaller than a size of the first VGA in the first signal path.

20. The method of claim 11, wherein the first current quantity is greater than the second current quantity such that a first noise magnitude regarding the first LO for the high performance mode is lower than a second noise magnitude regarding the second LO for the low consumption mode.

* * * * *